Oct. 13, 1942.    C. W. MOTT ET AL    2,298,539
IMPLEMENT HOLD-DOWN DEVICE
Filed March 26, 1940    4 Sheets-Sheet 4
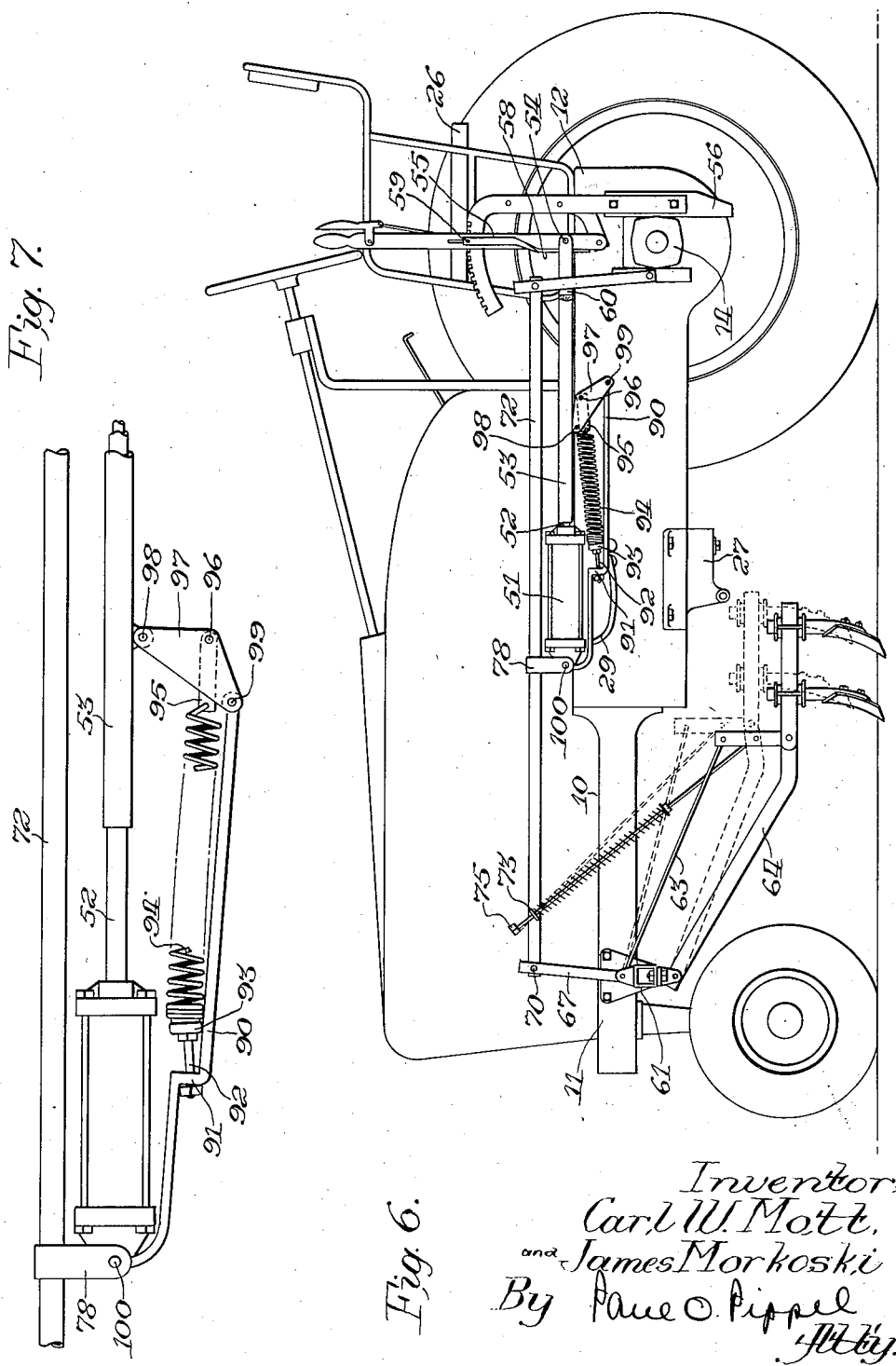
Inventors
Carl W. Mott,
and James Morkoski
By Paul O. Pippel
Atty.

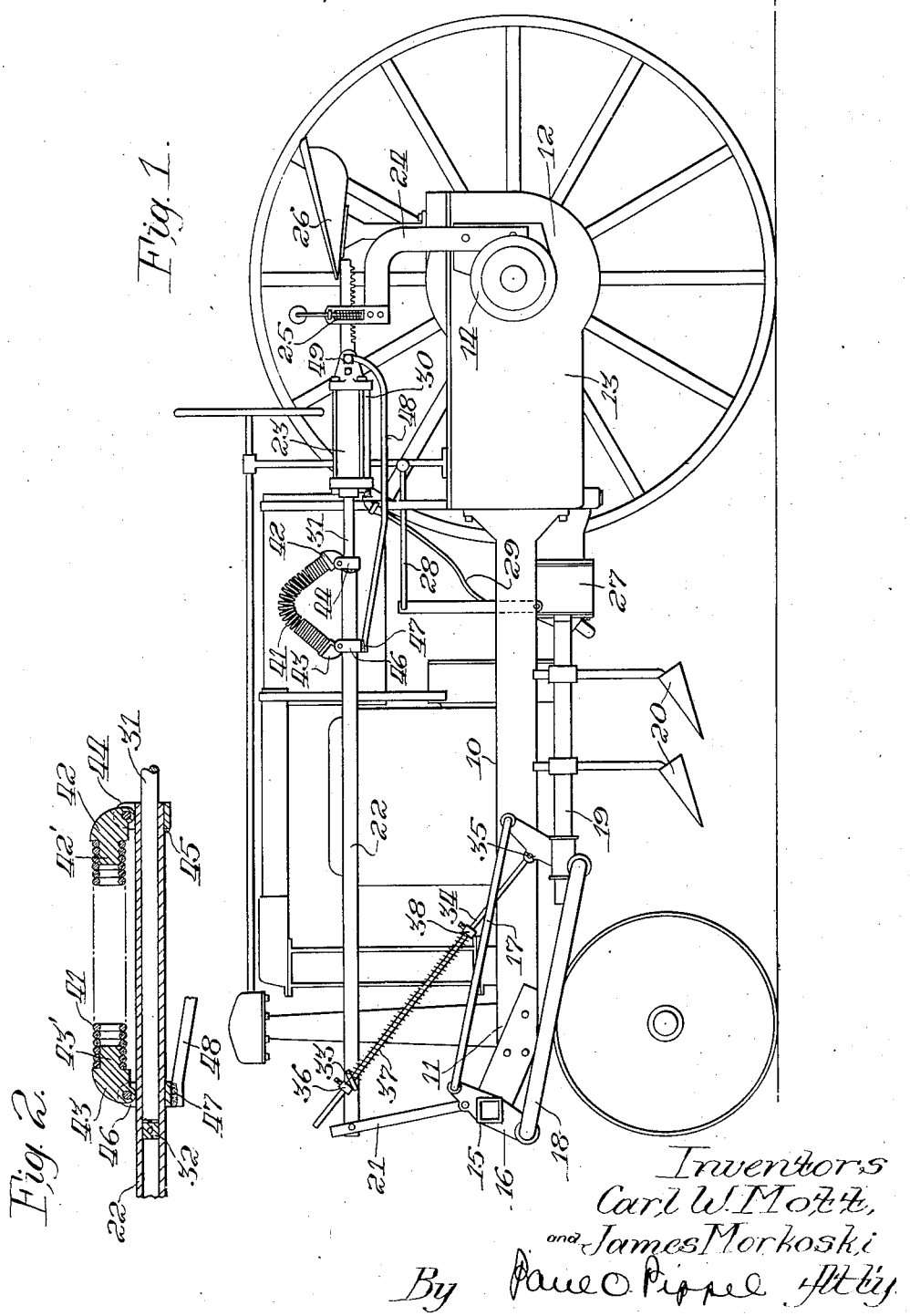

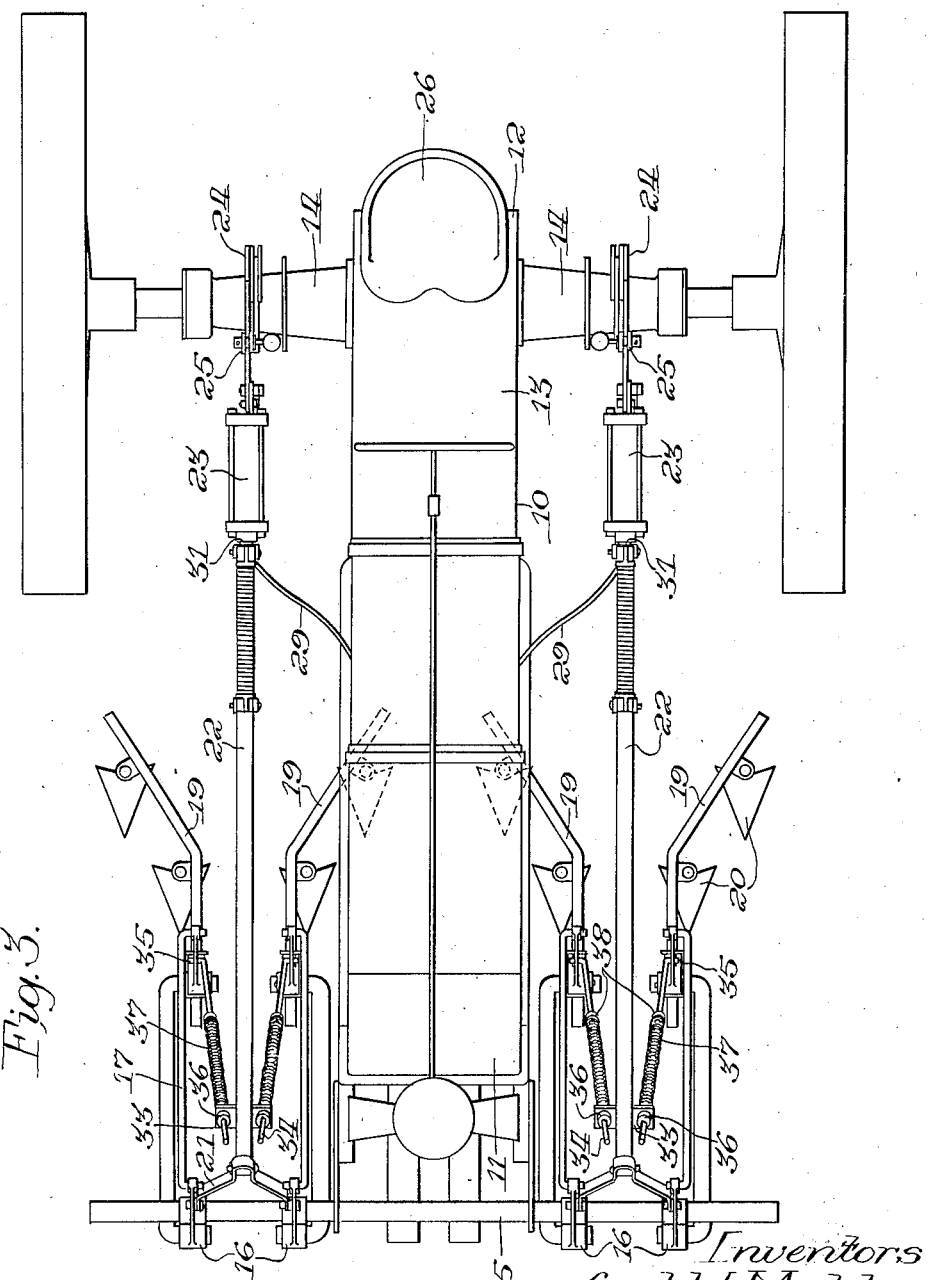

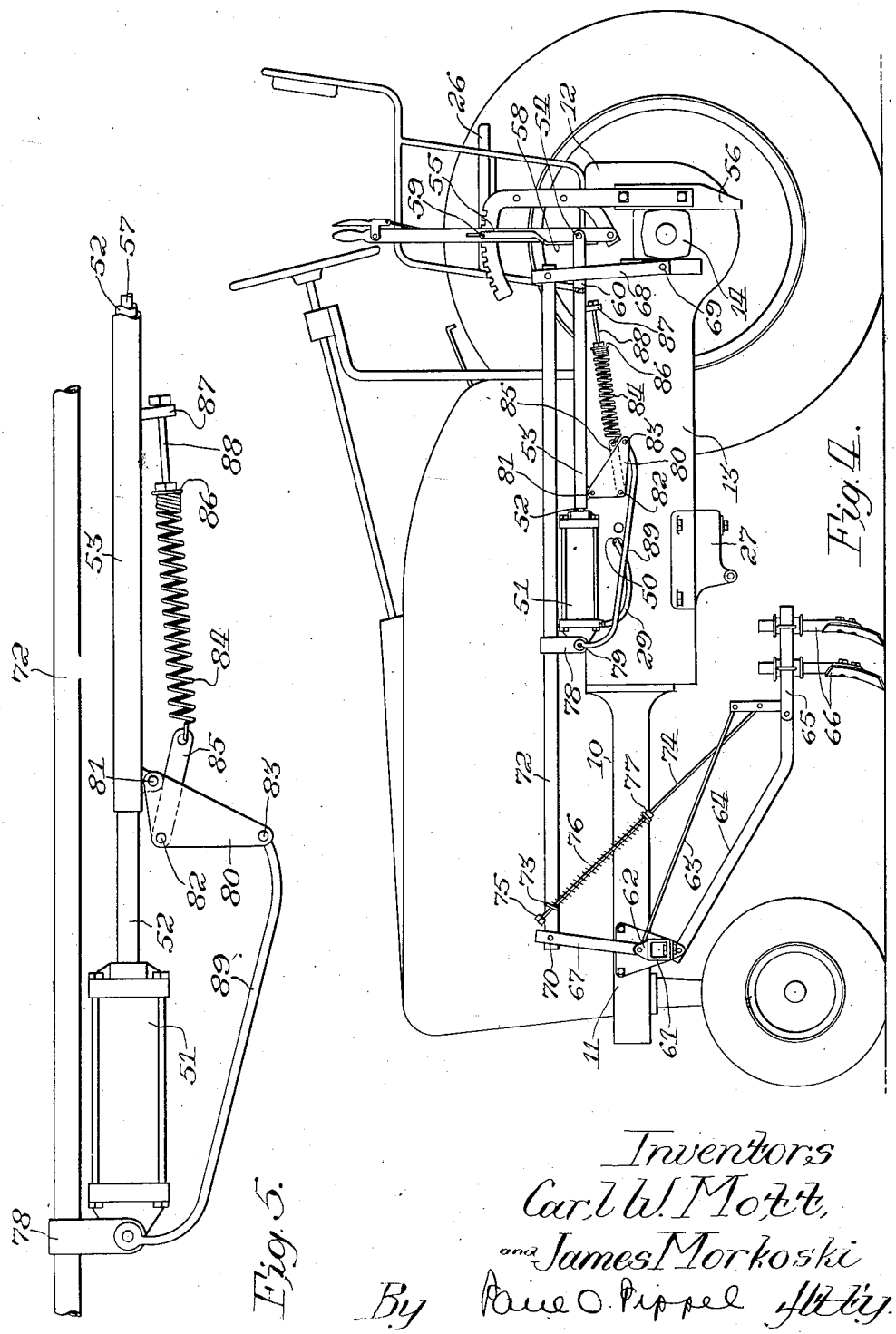

Patented Oct. 13, 1942

2,298,539

UNITED STATES PATENT OFFICE 2,298,539

IMPLEMENT HOLD-DOWN DEVICE

Carl W. Mott, La Grange, and James Morkoski, Canton, Ill., assignors to International Harvester Company, a corporation of New Jersey Application March 26, 1940, Serial No. 326,063

12 Claims. (Cl. 97—50)

This invention relates to hold-down arrangements for use with ground-working tillage implements, such as cultivators, which are directly connected to a tractor for movement to and from its ground-working position and adapted to be moved, at least from its ground-working position, by means of a power lift device associated with the tractor.

It is an object of the invention to have a biasing means associated with the power lift device which may be of a single acting type whereby the spring will tend to collapse the device when the rigs are lowered to ground-working position whereby a double acting effect will be given to the power lift arrangement.

It is another object of this invention to provide such a biasing arrangement adapted for holding the implement in the ground whereby, upon operation of the power lift, or lifting means, such spring means will automatically be ineffective upon operation of the lift device, or, in other words, will not work materially against the lifting means when the same is operated to lift the cultivator rigs.

It is another object of the invention to so arrange the spring device with reference to the connections between the power lift device and the cultivator rig that the entire arrangement is simplified and at the same time permits the arrangement to be particularly adapted for manual adjustment to regulate the working depth of the cultivator rigs.

According to the present invention, there has been provided a spring arrangement which is adapted to be associated with a single acting hydraulic lift device wherein, upon operation of the hydraulic lift device to lift the implement, the spring means will yield or vary to render itself relatively ineffective upon operation of the hydraulic cylinder. Upon release of the fluid from the hydraulic cylinder, the spring means will serve to force the fluid out of the cylinder for return to its reservoir and at the same time will tend to exert force upon the implement to cause it to enter into the ground. With a cultivator rig, there is always the tendency for the rig to leave the ground and it is to lessen this tendency that such cultivator rigs are connected to the tractor by means of parallel link arrangements. This hold-down spring of the present invention is so arranged with respect to the cultivator rig that a force will be continually exerted upon the rig to maintain the same in the ground or to enforce the cultivator rigs into the ground where the soil is of such hardness that additional weight is necessary to get the rigs into the ground and to maintain them therein. Thus, it may be said that the spring arrangement of the present invention will in effect supply more weight to the rigs for the maintenance of the same in the ground. Because it is undesirable to lift against the action of the spring, the spring is so arranged that little additional effort is required to lift the implement with the spring connected thereto for normally holding the same in its ground-working position.

For other objects and for a better understanding of the invention, reference may be had to the following detailed description taken in connection with the accompanying drawings, in which:

Figure 1 is an elevational view of a tractor showing one form of the spring arrangement associated with a hydraulic cylinder;

Figure 2 is a sectional and detail view of the spring and illustrating its connections with the arrangement;

Figure 3 is a plan view of the tractor shown in Figure 1 and showing identical arrangements at opposite sides of the tractor for lifting respectively those implements at that particular side of the tractor;

Figure 4 is a view similar to Figure 1 of a tractor in elevation and illustrating another form of the spring arrangement;

Figure 5 is a view showing the spring arrangement of Figure 4 in its extended position;

Figure 6 is still another form of the invention showing a tractor in elevation and with the implements in their ground-working position; and, Figure 7 is a view showing the spring arrangement of Figure 6 and showing the same in its extended position.

Referring now to the form of invention shown in Figures 1, 2, and 3, there is shown a tractor 10 having a forward portion 11 and a rear portion 12. The rear portion 12 includes a transmission and differential housing 13 and a transverse axle housing 14 extending laterally from each side of the housing 13.

On the forward portion 11, there may be connected a transversely extending tool-supporting bar 15 adapted to support the brackets 16 at any position transversely therealong and to which there is connected for each of the cultivator rigs upper and lower parallel links 17 and 18. To the rear end of these parallel links is connected a cultivator rig 19 having cultivator shovels 20. On a pair of the brackets 16, there may be pivoted a hairpin lever element 21 adapted for movement in a fore and aft direction with respect to the tractor. To the upper end of the hairpin lever element 21, there may be connected a lift pipe 22 which extends rearwardly along the side of the tractor for connection with a hydraulic cylinder lift device 23, which may be supported on a bracket structure 24 carried by the laterally extending axle housing 14 at the rear portion of the tractor. Briefly, this hydraulic cylinder device 23 is adjustably connected to the bracket structure 24 as indicated by the manual adjusting means 25 accessible to the operator's station 26 on the rear portion of the tractor.

The hydraulic cylinder device may be of the usual construction and is of a single acting type whereby fluid power is exerted only to one side of the piston element. This fluid power may be obtained from a reservoir and pump arrangement 27 adapted to receive power from the transmission and differential housing 13. This pump and reservoir housing may be controlled by a control rod 28 also accessible to the operator's station 26. By a pull upon the control rod 28, fluid is caused to pass through the fluid communications 29 and 30 to the rearward end of the cylinder device to force the piston forwardly and also to force the piston rod 31 associated therewith forwardly for abutting engagement with a stop element 32 within the pipe 22. See Figure 2.

The forward end of the lift pipe 22 has a laterally extending flange 33 through which passes pressure spring rods 34 connected at 35 to the cultivator rig 19. When forward movement is given to the lift pipe 22 the forward end thereof is caused to move about an arc because of its connection with the lever 21 and, when the plate 33 abuts with a set collar 36 on the lift rod 34, the rig 19 will be lifted from its ground-working position to take the position shown in Figure 1. Each of the pressure rods 34 carry a pressure spring 37, which abuts at its lower end a set collar 38. When the rig 19 is in its ground-working position, there is a continual pressure exerted upon the rig by virtue of these pressure springs 37 wherein the upper end of the same reacts against the plate 33 on the lift pipe 22. If some means is not provided to hold the lift pipe 22 fixed with relation to the piston rod 31, the action of these springs 37 will not be effective. Thus, some means is necessary to maintain the lift pipe 22 substantially fixed with reference to the piston rod 31 of the cylinder device 23.

For accomplishing this, there has been provided by the present invention a biasing spring arrangement which has sufficient strength to hold the lift pipe 22 substantially rigid when the implements are in their ground-working position. This spring arrangement may be identified as a master hold-down pressure spring or biasing device. This device provides means for holding the single-acting fluid cylinder device collapsed to thereby render the hold-down pressure spring means operative and effective when the implement is in its ground-working position. In the form shown in these Figures 1, 2, 3, this hold-down spring may take the form of a spring which will buckle when great force is applied to either end of the same. However, the spring must be of such dimension and so arranged as to accomplish the function desired of it.

Thus, according to this form, there is shown a buckling spring 41 having threaded into its ends respectively the pivot elements 42 and 43. The pivot element 42 may be pivotally connected to a bracket 44 secured as by welding to the rear end of the lift pipe 22, as indicated at 45. The pivot element 43 is pivoted to a bracket 46 which is secured, as by welding indicated at 47, to a rearwardly extending link element 48 which is connected to the tractor by connection to the rear end of the cylinder device 23, as at 49, which is in turn connected to the tractor through the bracket structure 24.

This buckling spring 41 will normally tend to maintain its straightened position shown in Figure 2, but, when acted upon by the cylinder device 23 acting through the piston rod 31 to move the lift pipe 22 forwardly for effecting lifting of the implement, it will suddenly yield thereby diminishing the force acting against the action of the cylinder device. In a sense this type of spring acts as a toggle and suddenly gives way to render the same substantially ineffective upon applying power to lift the implement. However, when the spring is in its normal position, the force is sufficiently great to overcome any action of the implements working on pressure springs 37. Should the cultivator shovels meet a sufficient obstruction whereupon the pressure springs 37 might be completely compressed, the master hold-down spring 41 would yield suddenly and thereby prevent any breakage of parts. The bracket 46, to which the pivot element 43 is connected, remains stationary and the pipe 22 may slide through the same. The pivot elements 42 and 43 have threaded portions 42′ and 43′, respectively, by which the ends of the spring 41 may be connected so that the spring may be held equally as well in tension as in compression.

Referring now to the forms of the invention shown in Figures 5 to 7, similar numerals to those used above will be used only in so far as they apply to the tractor. A new set of numerals will be used for the cylinder device, cultivator, and connection of both of these parts to the tractor and to each other. In these figures, there is shown a slightly different form of tractor but having generally a similar forward portion 11 and a similar rearward portion 12. The pump and reservoir housing 27 is, however, somewhat differently connected to the transmission and differential housing 13. The fluid communication 29 is partly within the housing 13 and is conducted from the same through an opening 50 for connection to a cylinder device 51. This cylinder device has a rearwardly extending sleeve 52 rigidly projected from the same for sliding connection with a supporting sleeve 53 pivotally connected at its rear end, as indicated at 54, to an adjusting mechanism 55 which is in turn carried on a bracket structure 56 supported by the transverse axle housing 14. Extending through the projected sleeve 52 is the piston rod 57. This piston rod 57 abuttingly engages with a locking element 58 connected with a detent 59 of the adjusting mechanism 55. As the rear end of the piston rod 57 abuts this locking element 58, the lock element and the detent 59 will be held rigidly and it will be impossible for the adjusting mechanism 55 to be adjusted at this time. In order for the piston rod 57 to extend through the rear end of the sleeve 54 for abutting engagement with the lock element 58, the sleeve 53 has connected at its rearward end, as by welding, along its sides straps 60 for the connection of the sleeve 53 to the adjusting mechanism 55 at 54. By this arrangement, the adjusting mechanism is automatically made inoperable when fluid pressure is supplied to the hydraulic device 51.

Connected to the forward portion of the tractor there is a transversely projected tool-supporting bar 61, to which supporting means 62 may be connected, for the attachment of upper and lower parallel links 63 and 64, to the lower end of which is connected a cultivator rig 65 having the cultivator shovels 66. On the supporting means 62 is connected a fore and aft movable lifting lever element 67. On the bracket structure 56 at the rear of the tractor there is likewise pivoted a similar pivoted lever element 68, as indicated at 69, and extending between these two lever elements 67 and 68 and pivotally connected therewith respectively at their free ends, as at 70 and 71, is a lifting pipe 72. The lifting levers 67 and 68 and the lifting pipe 72 provide a structure which is adapted to move fore and aft and to which a cultivating rig is attached for effecting lifting of the same. In the present instance, the lift pipe 72 has a laterally extending flange element 73 through which the lift rods 74 may normally slide when the cultivator rig is in its ground-working position, but so adapted that, when the lift pipe is moved forwardly to pivot the pivot levers 67 and 68, the plate 73 will engage with a set collar 75 to effect lifting of the cultivator rig. When in the ground-working position, the cultivator shovels 66 maintain their ground-working position by the usual pressure springs 76 reacting between the flanges 73 and a set collar 77 on the pressure rod 74.

Intermediately of the ends of the lift pipe 72, there is connected a bracket 78 by which the cylinder device 51 effects movement of the lift pipe forwardly to effect the lifting of the cultivator rig. The cylinder device 51 is connected to the bracket 78, as indicated at 79, and the same is at least in part supported therefrom.

Up to this point of the description, the parts shown in all of the Figures 4 to 7, inclusive, are substantially the same. The difference between the Figures 4 and 5 and Figures 6 and 7 remain only in the elements used for the attachment of the biasing spring. Reference should now be had to the form of the invention shown in Figures 4 and 5. In this form of the invention, there is pivoted to the forward end of the sleeve 53 a lever element 80 of substantially triangular shape, as at 81, and preferably includes two spaced plates. Vertically removed from the point of connection 81, there are points of connection 82 and 83 thereon. Connected between the point of connection 82, which is intermediate the points of connection 81 and 83 is a tension spring 84. The spring 84 is preferably connected at 82 through a link 85 in order to prevent interference of the spring with the lever element 80 upon the same being rotated from one position to another position. The other end of the spring 84 is threaded to a retaining element 86 which is adjustable with reference to a flange 87 rigid with the rear end of the pipe sleeve 53. This adjustment is effected by an adjusting bolt 88 threaded into the element 86.

The point of connection 83 of the lever 80 has connected to the same a link 89 which in turn is connected at 79 to the bracket 78 on the lifting pipe 72. When the power lift device 51 operates, the link 89 will move forward with the same to effect clockwise pivoting of the lever element 80 about its point of connection 81 with the sleeve 53 to take a position as shown in Figure 5. Normally, however, the spring 84 is acting on the lever element 80 at 82 to prevent forward movement of the lift pipe 72 and thereby to retain the cultivator shovels 66 in their ground-working position. The force with which this spring 84 acts will depend upon the setting of the adjusting bolt 88. Adjustment of the bolt 88 may be made to give the spring any desired initial tension.

When the cylinder 51 and the pipe rod 72 connected thereto moves forwardly, the piston rod 57 will react against the adjusting mechanism 55 and the lever element 80 will be rotated in a clockwise direction. The spring 84 will naturally tend to resist movement of the cylinder device and, as the lever element rotates, the spring will be acting with greater force and becomes effective, but the percentage effectiveness of the force of the spring reacting against the lift device will be diminished by virtue of the fact that the effective arm between the link 89 and the pivot point 81 lengthens and the effective arm between the connection element 85 and the pivot point 81 shortens. It should thus be seen that by this system of a lever element the resultant force of the spring 84, which would tend to prevent operation of the hydraulic device, will not reach a substantial amount and that it is, by arrangement of a lever such as shown, rendered less effective. While it is true that, upon increase in the length of a spring, the force required to tension the same has a straight-line function with the length as the same has been expanded and that the spring will build up a large total force, but it should be apparent that this increased force is compensated for by a changing of the lever arms so that the resultant force acting against the operation of the cylinder device 51 is not materially greater than the original acting when the implement is in its ground-working position. It should thus be seen that in this form of the invention there has likewise been provided a spring arrangement adapted normally to hold the cultivator rigs in their ground-working position, which spring arrangement automatically upon operation of the lift device becomes relatively ineffective, so as not to too greatly hinder the operation of the power lift device.

Referring now to the form of invention shown in Figures 6 and 7, there is shown a similar arrangement of a spring device, but one wherein the pivot element 80 may be connected at a point removed from the forward end of the sleeve 53. By such an arrangement, it is possible somewhat to simplify the construction and at the same time to tend to eliminate as far as possible side force acting intermediate the ends of the arrangement to cause a side thrust upon the sleeve 53, so that easy sliding operation of the same over the projecting sleeve 52 of the hydraulic device 51 is had. It has been found that, by having the pivot element 80 connected, as shown in Figures 6 and 7, smoother operation of the device will result. It is, therefore, to be regarded that the forms shown in Figures 6 and 7 are a preferred form of the invention.

In this form of the invention, the link element 90 corresponding to the link element 89, has an offset portion 91 adapted to receive the adjusting bolt 92, to which is adjustably connected the connecting element 93 for the connection of a spring 94. The other end of the spring 94 is connected through a connecting element 95 to an intermediate point of connection 96 of a pivot element 97 corresponding to the pivot element 80 of the form shown in Figures 4 and 5. The pivotal element 97 is in turn pivoted at 98 to the sleeve 53, but at a point substantially removed from the forward end of the sleeve 53. The link 90 is similarly connected to the pivot element 87, as indicated at 99, and is connected at 100 to the element 78 of the lift pipe 72. By this arrangement, the spring 94 acts very closely along the central axis of the sleeve, so that minimum side thrust is exerted which would in any way tend to cause rubbing of the sleeves 52 and 53. As the cylinder device is actuated, the arrangement will finally assume a position shown in Figure 7, the pivot element 97 having been pulled by means of the link 90 about the pivot point 98 on the sleeve 53. Since the point of connection 96 of the spring with the lever element 97 is intermediate the points 98 and 99, a changing leverage effect may be given to the same, so that the resultant force acting against the power lift will not be greatly increased beyond the initial setting of the spring by the adjusting means 92.

In Figure 4 is shown the implement or cultivator rig positioned immediately prior to the same being forced into the ground. Assuming that the ground is hard, it should be apparent that additional weight is necessary for the cultivator rigs to be forced into the ground. By means of the arrangements of the present invention, this additional weight is supplied. The spring arrangements enable the power lifting means to have somewhat the effect of a double acting arrangement whereby the piston is retained when the fluid has left the device. With the piston being so retained, the lift pipe 72 will be given a definite retracted position properly to locate the flange 73, depending upon the depth adjustment of the adjusting mechanism 55. With the lift rod 72 and its flange 73 given a definite position, the pressure rod spring 76 will thereby be given something against which it may react, and, if said spring is properly set, it is very likely that the cultivator shovels 66 will be forced into the ground thereby to assume the cultivating position shown in Figure 6. Upon operation of the power lift device, the flange 73 will contact with the stop collar 75 to lift the cultivating rig to the position shown in dotted lines in Figure 6, and at the same time to cause the spring arrangement to take the position shown in Figure 7.

It should be apparent that, by the three forms of the invention disclosed, a spring means for holding cultivating rigs in the ground has been provided and that such an arrangement has been so devised that the operation of the lifting device is not greatly impeded.

While various changes may be made in the details of the arrangement, it shall be understood that such changes shall be within the spirit and scope of the present invention as defined in the appended claims.

What is claimed is:

1. In combination, a tractor, an implement mounted on the tractor for vertical movement to and from its ground-working position, means for lifting the implement including a single-acting hydraulic cylinder lift device adapted to react against the tractor and having a movable part, and a part relatively movable with respect to the movable part of the cylinder lift device, biasing spring means, and means for connecting said biasing spring means between said last-mentioned part and the tractor to hold both of said parts in spring biased and collapsed relationship when said device is freed of hydraulic pressure and the implement is in its ground-working position.

2. In combination, a tractor, an implement mounted on the tractor for vertical movement to and from its ground-working position, a power lift device for moving the implement from its ground-working position, and spring means adapted to be buckled by the power lift device upon operation of the same but tending to straighten upon release of the power lift to resiliently force and retain said implement in its ground-working position.

3. In combination, a tractor, an implement mounted on the tractor for vertical movement to and from its ground-working position, a single-acting hydraulic power lift device having a movable part, means for abuttingly connecting the movable part to the implement, a buckling spring connected between said connecting means and the tractor to normally hold the implement in its ground-working position and at the same time to hold the hydraulic device collapsed, and said spring means being so arranged as to buckle when the implement strikes an obstruction and upon operation of the power lift device.

4. In combination, a tractor having forward and rearward portions, an implement mounted on the forward portion of the tractor for vertical movement, a pivoted lifting lever at the forward portion of the tractor, a bracket structure at the rear of the tractor, a single-acting hydraulic cylinder device adjustably connected at one end to the bracket structure and having a movable piston rod, a fore and aft movable lift pipe connected to the lever and to the implement, said pipe telescopically arranged with respect to said piston rod which abuttingly engages with the pipe internally thereof to effect lifting of the implement, and spring means connected between said pipe and the tractor through the bracket structure and tending to maintain the cylinder collapsed whereby bodily adjustment of the cylinder device will effect adjustment of the implement, and said spring means being made substantially ineffective upon operation of the cylinder device to effect the lifting of the implement.

5. In combination, a tractor, an implement connected to the tractor for vertical movement to and from its ground-working position, power means including a movable part, means for connecting the power means to the implement including a part adapted to be engaged by said movable part of the power means, and spring means adapted to normally hold said movable part in engagement with said part adapted to be engaged thereby when the implement is in its ground-working position, said spring means being so connected and arranged between said parts as to be made substantially ineffective between the two parts after operation of the power means through a small amount of its movement.

6. In combination, a tractor, an implement connected to the tractor for vertical movement to and from its ground-working position, a single-acting hydraulic cylinder device connected to the tractor and having a piston rod, means for connecting the piston rod to the implement to move the same including a pipe telescopically arranged about said piston rod and adapted to be operatively engaged by the same internally thereof, a buckling spring pivotally connected at one end thereof to the pipe and at its other end thereof to the tractor, said spring being buckled by the cylinder device upon operation of the same to move the implement but tending to straighten upon release of fluid from the cylinder device to collapse the same and to resiliently retain the implement in its ground-working position.

7. In combination, a tractor, an implement connected to the tractor for vertical movement to and from its ground-working position, a power lift device for moving the implement and having relatively movable parts, one of said parts being connected to react against the tractor and the other being connected to the implement, and biasing means connected around said relatively movable parts to normally hold the parts collapsed with respect to each other, said biasing means including a lever element pivoted relatively to and between said parts, the pivot connection to one of the parts being removed from the pivot connection to the other of said parts, and a biasing spring connected between one of the parts and the lever element, the point of connection of the spring with the lever element being intermediate the two pivot connections of the lever with the respective parts, said lever element being so shaped and arranged with respect to said parts that, upon operation of the power lift device, the lever is forced to move about at least one of its pivot connections, whereby irrespective of the placing of increased energy into the spring the resultant effect acting between the parts is minimized.

8. In combination, a tractor, an implement connected to the tractor for vertical movement to and from its ground-working position, a single-acting power lift device connected to the implement to lift the same and including relatively movable parts, one of the parts adapted to react against the tractor, biasing means for holding said parts against relative movement comprising a lever element pivotally associated with relation to one of said parts, a link pivotally connected to the lever element and to the other of said parts whereby, upon forcible separation of said parts, the lever element will be rotated, and spring means connected to the tractor and to the lever at a point between the connection of the link thereto and its point of pivotal association with one of the parts, whereby, when the lift device is operated, the resultant effectiveness of the spring between the parts will be prevented from greatly increasing.

9. In combination, a tractor, an implement connected to the tractor for vertical movement to and from its ground-working position, a single-acting power lift device connected to the implement to lift the same and including relatively movable parts, one of the parts adapted to react against the tractor, biasing means for holding said parts against relative movement comprising a lever element pivotally associated with relation to one of said parts, a link pivotally connected to the lever element and to the other of said parts whereby, upon forcible separation of said parts, the lever element will be rotated, spring means connected to the tractor and to the lever at a point between the connection of the link thereto and its point of pivotal association with one of the parts whereby, when the lift device is operated, the resultant effectiveness of the spring between the parts will be prevented from greatly increasing, and means for adjusting the spring means to vary the force tending to hold the parts together.

10. In combination, a tractor, an implement connected to the tractor for vertical movement to and from its ground-working position, a single-acting power lift device connected to the implement to lift the same and including relatively movable parts, one of the parts adapted to react against the tractor, biasing means for holding said parts against relative movement comprising a lever element pivotally associated with relation to one of said parts, a link pivotally connected to the lever element and to the other of said parts whereby, upon forcible separation of said parts, the lever element will be rotated, and spring means connected to the link and to the lever at a point between the connection of the link thereto and its point of pivotal association with one of its parts, whereby, when the lift device is operated, the resultant effectiveness of the spring between the parts will be prevented from greatly increasing.

11. In combination, a tractor, an implement connected to the tractor for vertical movement to and from its ground-working position, a single-acting power lift device connected to the implement to lift the same and including relatively movable parts, one of the parts adapted to react against the tractor, biasing means for holding said parts against relative movement comprising a lever element pivotally associated with relation to one of said parts, a link pivotally connected to the lever element and to the other of said parts whereby, upon forcible separation of said parts, the lever element will be rotated, spring means connected to the link and to the lever at a point between the connection of the link thereto and its point of pivotal association with one of its parts, whereby, when the lift device is operated, the resultant effectiveness of the spring between the parts will be prevented from greatly increasing, and means for adjusting the spring means at its point of connection with the link to vary the force tending to hold the parts together.

12. In combination, a tractor, an implement connected to the tractor for vertical movement to and from its ground-working position, a single-acting power lift device connected to the implement to lift the same and including relatively movable parts, one of the parts adapted to react against the tractor, biasing means for holding said parts against relative movement comprising a lever element pivotally associated with relation to one of said parts, a link pivotally connected to the lever element and to the other of said parts whereby, upon forcible separation of said parts, the lever element will be rotated, said link having an offset portion, spring means connected at one end to the lever element at a point between the connection of the link thereto and its point of pivotal association with one of the parts, and means for adjustably connecting the other end of the spring means to the offset portion of said link, whereby, when the lift device is operated, the resultant effectiveness of the spring between the parts will be prevented from greatly increasing.

CARL W. MOTT.
JAMES MORKOSKI.